Patented Feb. 9, 1932

1,844,857

UNITED STATES PATENT OFFICE

ALFRED T. LARSON, OF WILMINGTON, DELAWARE, ASSIGNOR, BY MESNE ASSIGNMENTS, TO E. I. DU PONT DE NEMOURS & COMPANY, OF WILMINGTON, DELAWARE, A CORPORATION OF DELAWARE

CATALYST FOR THE PRODUCTION OF METHANOL AND OTHER CARBON COMPOUNDS AND PROCESS OF MAKING SAME

No Drawing. Application filed May 14, 1925. Serial No. 30,361.

This invention relates to the production of carbon compounds and catalytic agents for use therein. In order to disclose more clearly the nature of my invention, I have confined this specification to the synthesis of a single hydrocarbon derivative; namely, methanol. I do not intend to limit myself, however, to the production of this particular carbon compound since other carbon compounds may be formed by the process and the catalytic materials disclosed herein.

It is generally known (see for instance French Patent No. 540,543 to Patart) that methanol can be made directly from carbon monoxide and hydrogen according to the following reaction:

$$CO + 2H_2 = CH_3OH$$

Since the reaction involves the liberation of heat, it is obvious that the amount of methanol in an equilibrium mixture increases as the temperature of the reaction decreases. Since the reaction involves a decrease in volume, (one volume carbon monoxide plus two volumes hydrogen give one volume methanol), it is also obvious that the methanol in an equilibrium mixture increases as the pressure of the reacting gases increases. By means of calculations based on the Nernst heat theorem, it may be shown that the amounts of methanol in equilibrium with carbon monoxide and hydrogen at pressures near atmospheric are exceedingly small. For example, at any temperature above 250° C. less than 0.1% methanol can be formed. These calculations show, however, that the amount of methanol which can remain in stable equilibrium with a hydrogen-carbon monoxide gas mixture increases rapidly as the pressure is increased. At 300° C. and 200 atmospheres pressure, for example, 45% methanol formation is possible.

The equilibrium conditions are not, however, a sufficient basis for selecting operating conditions. In the first place, the formation of methanol from carbon monoxide and hydrogen proceeds with extreme slowness and suitable catalyzers must be employed before technical amounts of methanol can be formed. In the second place, carbon monoxide and hydrogen may react to form other products than methanol. Indeed, under certain operating conditions and with certain catalyzers, no detectable amounts of methanol are formed. Even with the same catalyzer, by simply changing the operating conditions different products may be obtained. It is obvious, then, that there must be not only a careful selection of the catalyzer material but also an exact determination of the conditions under which such catalysts operate when a single product is desired, as for example, methanol.

A number of substances have been suggested in such United States patents as Nos. 1,201,850 and 1,271,013 as suitable catalysts for the direct synthesis of carbon compounds, including alcohols, from carbon monoxide and hydrogen; for example, oxides of chromium, titanium, molybdenum, zinc and manganese. It has also been suggested in German Patent No. 295,202 that the addition of certain metallic constituents such as copper would effect some improvement. These catalytic materials have been brought into contact with copper in the form of turnings, wool, or gauze. Copper prepared by the reduction of an oxide of copper has also been employed. For example, chromium oxide and copper oxide have been precipitated simultaneously and the oxide mixture reduced in hydrogen. None of these methods, however, has yielded satisfactory results. The oxide mixture prepared by precipitation has been somewhat more selective in its action than the others but it has not been well suited as a catalyst in the technical production of methanol because of its tendency to crumble into a fine powder during the reduction and the synthesis. Attempts to correct this difficulty have led to the use of various supporting materials, as for example, asbestos. Such materials, however, do not contribute to the synthesis, and constitute an undesirable dilution of the catalyst material. Furthermore, catalysts containing copper, when prepared by any of the methods which have been employed heretofore, have not been reactive at the low temperatures favorable to the production of methanol.

Now, I have discovered a method for preparing a metal oxide admixed with metallic copper, which results in the formation of a highly reactive catalyst well suited to the selective synthesis of carbon compounds, particularly methanol. According to my improved method, I melt a mixture of pure copper oxide and one or more catalytic oxides such as are mentioned above, allow the mass to cool, break into fragments of suitable size, and finally reduce in hydrogen. The granules produced by this method are hard, coherent, highly porous, and very reactive at relatively low temperatures.

The following specific example is given by way of illustrating the preparation of my improved catalytic material.

*Example I.*—A mixture comprising 8–9 parts copper oxide (calculated as metallic copper) and 1–2 parts manganese oxide (calculated as metallic manganese) is slowly fused under an electric arc or an oxy-hydrogen torch. The fused mass is allowed to cool, crushed and screened to size, and finally reduced in hydrogen at ordinary pressures and at temperatures within the interval 250–350° C.

The catalysts produced by my improved method have been found to permit a greater selectivity in the production of carbon compounds from carbon monoxide and hydrogen than has heretofore been possible. For instance, by suitable regulation of the pressure of the reacting gases and the temperature of the contact mass within certain limits, the reaction may be largely confined to the synthesis of a single product, as for example, methanol. Thus, when a mixture of carbon monoxide and hydrogen under a pressure of 250–300 atmospheres is passed over my improved catalysts heated to 275–300° C., the principal product obtained will be methanol.

The following considerations may perhaps make clear why my invention possesses the advantages above described. It is known that a great variety of products may be formed by the direct combination of carbon monoxide and hydrogen. It is possible that the temperature of the catalyst must be confined within a certain rather narrow temperature range if there is to be any selectivity in the synthetic reaction leading to the formation of carbon compounds from hydrogen and carbon monoxide. Because of the considerable heat evolved during the formation of any one of the carbon compounds which may be formed, it has probably been difficult to confine the real temperature of the catalyst (as distinguished from the apparent temperature as indicated by the temperature of the reacting gases) within those limits which favor the formation of any one desired product. Copper, being an excellent conductor of heat, may owe its beneficial action as a constituent of a catalyst for the methanol synthesis to its ability to dissipate heat as rapidly as it is liberated. The best results according to this theory would be obtained when the copper was brought into very intimate contact with the catalytic material used. It is obvious that this intimate contact is achieved when catalysts are prepared by the procedure which I have described above. As will be evident, readily reducible oxides of good heat conducting metals other than copper, for example, iron, cobalt, or nickel, etc., (particularly in the synthesis of carbon compounds other than methanol) may be melted together with one or more catalytic oxides, the catalysts thus obtained coming within the scope of my invention.

I have already called attention to the fact that the equilibrium amount of methanol which can be produced at atmospheric pressure is exceedingly small, but that appreciable amounts are possible at higher pressures. When a suitable catalyst is employed, practical yields of methanol can be obtained at pressures as low as 20 atmospheres. Better results, however, are obtained at higher pressures. I prefer to operate the process within the range of 200–300 atmospheres pressure, although synthesis may be carried on successfully at pressures as high as 1,000 atmospheres.

Knowing the nature of the catalytic material and the temperature and pressure ranges within which it will give satisfactory operation, the other technical details of the process become obvious to those skilled in this and allied arts. In any catalytic process where the reaction is only partially completed, the product of the reaction must be separated from the reacting gases and the uncombined gases again brought into contact with the same or a similar catalyst for further action. The partial pressure of methanol in the compressed gas mixture is such that it is readily liquefied and removed from the high pressure system by cooling the gases which leave the catalyst to between 0° and 20° C.

For practical reasons the high pressure apparatus in which the synthesis of methanol is effected is constructed of steel. Now, carbon monoxide may react in the presence of iron according to one or both of the following reactions:

(1) $2CO \rightarrow CO_2 + C$. (see Abegg's Handbuch Anorganische Chemie, vol. 3, part 2, pages 190–191).

(2) $5CO + Fe \rightarrow Fe(CO)_5$. (see British Patent No. 17,608 of 1908 to Mond, and article by Van Breukeleveen and Horst, J. für Gasbeleucht, 42, [44], 750 [1899]).

If the first reaction takes place, enough carbon will eventually collect within the high pressure system to interfere seriously with the free flow of the gaseous mixture. If the second reaction occurs, iron carbonyl collects in the gas mixture and eventually comes into contact with the catalyst. Since iron carbonyl decomposes at the temperature of the active catalyst, deposition of iron upon the catalyst results. The iron carbonyl therefore introduces an ingredient which is not favorable to methanol formation, since metals such as iron, cobalt and nickel are known (as shown by French Patents Nos. 355,325 and 356,471) to bring about the complete reduction of carbon monoxide to methane. As a consequence, wherever there is danger of carbon deposition or of carbonyl formation the pressure resisting apparatus ought to be suitably protected from contact with the compressed carbon monoxide. Since copper does not readily react with carbon monoxide, it forms an efficient and practical protector for the steel surfaces.

A carbon monoxide-hydrogen gas mixture for the synthesis of methanol may be made by the well-known water-gas process in which steam and incandescent coke are made to react. By this process, however, certain other gases are usually liberated which constitute undesirable constituents of the gas mixture. For example, sulfur and phosphorus compounds, also, traces of iron carbonyl are usually present. These impurities should be carefully excluded if the best results are to be obtained.

I claim:—

1. The process of making a catalyst capable of accelerating the combination of hydrogen with carbon monoxide which comprises melting together an oxide of a metal which is a member of the group consisting of titanium, chromium, manganese, zinc, and molybdenum, and a readily reducible oxide of a good heat-conducting metal, to produce a uniform mixture of said oxides, cooling and granulating the mixture, and reducing the granulated material with hydrogen at an elevated temperature, to form a catalytic oxide intimately associated with a good heat-conducting metal.

2. The process of making a catalyst capable of accelerating the combination of hydrogen with carbon monoxide which comprises melting together an oxide of a metal having an atomic weight between 48 and 55, and a readily reducible oxide of a good heat-conducting metal, solidifying the mixture, and subjecting the product to the reducing action of hydrogen.

3. The process of making a catalyst capable of accelerating the combination of hydrogen with carbon monoxide which comprises melting together a metallic oxide capable of accelerating said reaction and copper oxide, cooling and subdividing the resulting mass, and reducing the copper oxide thereof to metallic copper.

4. A catalyst capable of accelerating the combination of hydrogen with carbon monoxide, said catalyst comprising an oxide which is a catalyst for said reaction, intimately associated with a good heat-conducting metal, and obtained by fusing said oxide with the oxide of said metal, and reducing the resulting subdivided, solidified mixture in hydrogen at a high temperature.

5. A catalyst capable of accelerating the combination of hydrogen with carbon monoxide, said catalyst comprising an oxide of a metal which is a member of a group consisting of titanium, chromium, manganese, zinc, and molybdenum, intimately associated with a good heat-conducting metal, said catalyst being obtained by fusing together said oxide and the oxide of said good heat-conducting metal, and reducing, in hydrogen, the resulting mixture, suitably solidified and subdivided.

6. A catalyst capable of accelerating the combination of hydrogen with carbon monoxide, said catalyst being the reduction product of a fused mixture of copper oxide and an oxide of manganese.

7. A catalyst capable of accelerating the combination of hydrogen with carbon monoxide, said catalyst being the reduction product of a fused mixture of copper oxide and an oxide of manganese, and obtained by reducing the solidified and subdivided mixture in hydrogen at a temperature between about 250 and 350° C.

8. A catalytic body comprising the reduction product of a fused mixture of copper oxide and a metal oxide capable of accelerating the combination of hydrogen with carbon monoxide.

In testimony whereof I affix my signature.

ALFRED T. LARSON.